United States Patent [19]

Howard

[11] 4,066,172

[45] Jan. 3, 1978

[54] MOBILE RACK FOR REFUSE CONTAINERS

[76] Inventor: Eddie Howard, 885 Shadowline Drive, Memphis, Tenn. 75126

[21] Appl. No.: 658,725

[22] Filed: Feb. 17, 1976

[51] Int. Cl.² .............................................. A47G 29/00
[52] U.S. Cl. ..................................... 211/78; 248/146; 248/DIG. 7
[58] Field of Search ......... 248/131, 146, 129, DIG. 7, 248/145; 211/71, 145, 131, 163, 78, 77, 81, 75, 129; 108/142; 280/47.26, 87.01

[56] References Cited

U.S. PATENT DOCUMENTS

| 663,046 | 12/1900 | Schaeffer | 211/78 X |
|---|---|---|---|
| 1,247,195 | 11/1917 | Willett | 211/78 |
| 1,790,138 | 1/1931 | Dunn | 232/41 C |
| 2,522,036 | 9/1950 | Haake | 248/145 |
| 2,582,906 | 1/1952 | Heldenbrand | 248/DIG. 7 |
| 3,188,109 | 6/1965 | Broadrick | 280/47.26 |
| 3,306,464 | 2/1967 | Rogers | 211/78 |
| 3,642,145 | 2/1972 | Shelton | 248/149 X |
| 3,666,222 | 5/1972 | Griggers | 248/DIG. 7 |
| 3,696,938 | 10/1972 | Sherman | 211/78 |

*Primary Examiner*—J. Franklin Foss
*Attorney, Agent, or Firm*—John R. Walker, III

[57] ABSTRACT

A rack including a platform for restingly supporting refuse containers, a restraining band disposed above the platform for confining the containers, a plurality of stanchions extending upwardly from the platform for cooperating with the restraining band in confining the containers, and a plurality of casters for supporting the platform above a supporting surface whereby the rack may be manually moved along a straight line or about a central point.

12 Claims, 4 Drawing Figures

U.S. Patent  Jan. 3, 1978  4,066,172

MOBILE RACK FOR REFUSE CONTAINERS

BACKGROUND OF THE INVENTION

1. Field of the Invention

This invention relates to mobile racks for supporting refuse containers.

2. Description of the Prior Art

Heretofore, various means have been developed for supporting refuse containers. See, for example, Broadrick (U.S. Pat. No. 3,188,109); Black (U.S. Pat. No. 3,276,600); Rogers (U.S. Pat. No. 3,306,464); and Bailey (U.S. Pat. No. Re. 27,437). None of the above patents disclose or suggest the the present invention.

Rogers discloses a movable receptacle holder and support for holding and supporting a plurality of receptacles above a supporting surface. The Rogers holder, however, is not entirely satisfactory because, for example, it is either fixed to a concrete slab, i.e., immovable, or supported by a dolly. Other movable receptacle supports have been previously developed. However, these prior receptacle supports have not been entirely satisfactory due to their mobility limitations and the procedures required to disassemble them for storage or transport. Also, none of the devices employ the concept of combining a mobile refuse container rack with suitable enclosing structure, e.g., a fence or the like.

SUMMARY OF THE INVENTION

The present invention is directed towards overcoming the problems and disadvantages of prior mobile racks for refuse containers. The concept of the present invention is to provide a rack for ridably supporting several refuse containers in a unique manner which enables the rack to be moved in a straight line or about a central point in carousel or turnstile fashion.

The mobile rack of the present invention preferably includes a platform for supporting the containers, a hoop-like restraining band for confining the containers, a plurality of stanchions for cooperating with the restraining band in confining the containers, a plurality of casters for ridably supporting the platform and allowing manual movement along a straight line or about a central point, and an upright center post extending upwards through a sleeve structure attached to the platform for permitting the rack to revolve about the center post in carousel fashion thus bringing empty containers to a point of prominence. The rack, if desired, may be placed in an opening in a fence or other suitable enclosing structure for use in turnstile fashion whereby rotation of the rack allows for selection of any container on either side of the enclosing structure while constantly blocking the pathway therebetween.

DESCRIPTION OF THE PREFERRED EMBODIMENT

Figure 1:
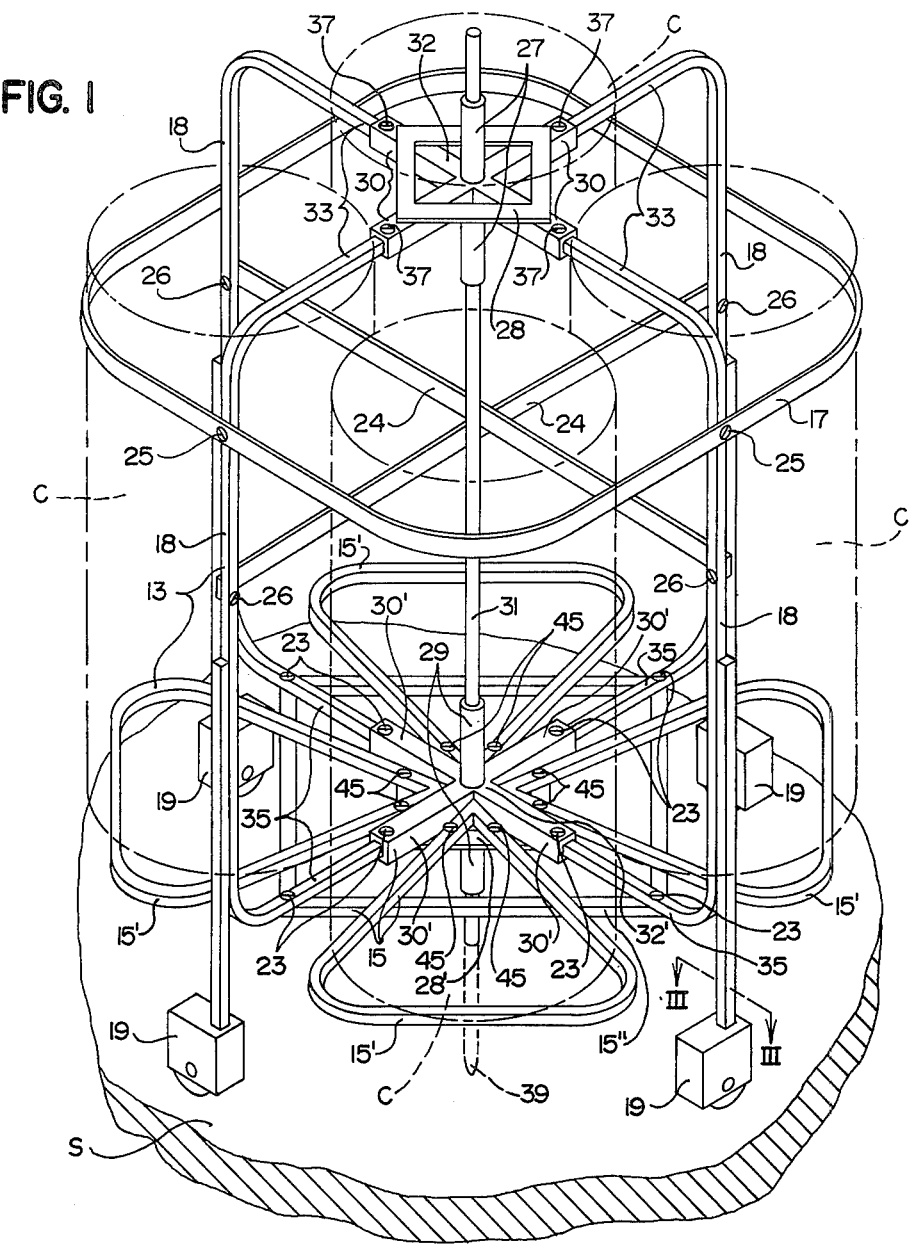
FIG. 1 is a pictorial view of the mobile rack for refuse containers of the present invention on a supporting surface with a plurality of supported containers shown in phantom lines.
Figure 3:
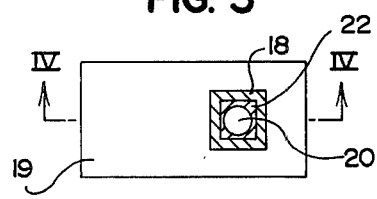
FIG. 3 is a sectional view of one of the casters of the present invention as taken on line III—III of FIG. 1.
Figure 4:
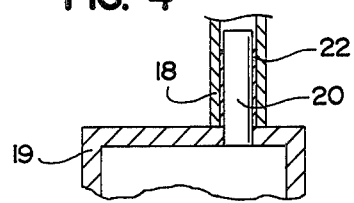
FIG. 4 is a sectional view of one of the casters of the present invention as taken on line IV—IV of FIG. 3.

The mobile rack 11 of the present invention is comprised of a frame 13 which includes a platform member 15 and a plurality of stanchion members 18. The platform member 15 is comprised of a plurality of supports 15', a support brace 15" and a plurality of sleeve supports 30'. Rotatably attached to the lower end of each stanchion member 18 is a caster 19. The platform member 15, shown (see FIG. 1) supporting a plurality of refuse containers C, is attached to the stachion members 18 by bolts 23. Attached to the upwardly extending stanchions 18 by bolts 25 is a horizontally disposed restraining band 17. The restraining band 17, the stanchion members 18 and the platform 15 when combined form the rack 11 which confines and supports the refuse containers C. The plurality of casters 19 which swivel about a vertical axis, support the frame 13 above a supporting surface S in a manner which selectively allows the frame 13 to be moved manually along a straight line or rotated about a central point in carousel fashion. Also, each caster 19 is attached to its related stanchion 18 by the insertion of the caster axle 20 into the stanchion bushing 22 at the lower end of the stanchion (see FIGS. 3 and 4).

The rack 11 includes sleeve means that comprises concentrically disposed upper and lower tubular sleeves 27 and 29 along with upper and lower sleeve supports 30 and 30' with sleeve supports 30' being a part of the platform 15. It will be understood that the sleeve supports 30 are arranged in spokelike fashion and converge where they are preferably integrally joined to provide a hub 32, which supports sleeves 27. Sleeve supports 30' are similarly arranged to provide hub 32'. An upright center post 31 is freely passed through the tubular sleeves 27 and 29 so that the rack 11 is supported in a condition which prohibits any movement except rotational movement. Thus, with the sleeve 29 in a fixed condition the frame 13 is free to revolve about an axis established by the stationary center post 31.

The frame 13 includes a plurality of radially disposed arm members 33 preferably integrally attached to the upper ends of stanchions 18. The arm members 33 converge at the upper sleeve supports 30 and are respectively extended into and are attached to the upper sleeve supports 30 by bolts 37 thus establishing sleeve 27 in the fixed condition described above and allowing free passage therethrough of center post 31. The center post 31 has a tapered lower end 39 which facilitates the driving of the center post 31 into the earth's surface S so that the center post is supported in a fixed condition. The frame 13 also includes a plurality of radially disposed arm members 35 preferably integrally attached to the lower ends of stanchions 18. The arm members 35 converge at the lower sleeve supports 30' and are respectively extended into and are attached to the lower sleeve supports 30' by bolts 23, thus establishing sleeve 29 in the fixed condition already described and allowing free passage therethrough of center post 31.

The frame 13 may also include a plurality of brace members 24 which are horizontally attached by bolts 26 between the stanchions 18 in order to provide for a more stable arrangement of the stanchions 18 and also to act as dividers for the refuse containers C. In addition, there are brace members 28 and 28' with brace member 28 welded to sleeve support 30 and brace member 28' welded to sleeve support 30'. The braces 28 and 28' provide for a more sturdy arrangement of the spoke-like sleeve supports 30 and 30'. Also, the container supports 15' are attached to the brace 28' by bolts 45.

A first knock-down means, which consists of bolts 23, is included in the rack 11 for facilitating assembly and disassembly of stanchion members 18 with platform member 15. There is also a second and third knock-down means. The second knock-down means, which consists of bolts 25, facilitates assembly and disassembly of restraining band 17 with stanchion member 18 and the third knock-down means which consists of bolts 37, facilitates assembly and disassembly of upper arm members 33 with upper sleeve support 30. The first, second and third knock-down means provide for more compact storage and shipping of the rack 11. The disassembly of the rack 11 results in the rack being broken down into the following separate parts: a plurality of stanchion members 18, a platform member 15, a restraining band 17 and an upper sleeve support 30.

Figure 2:
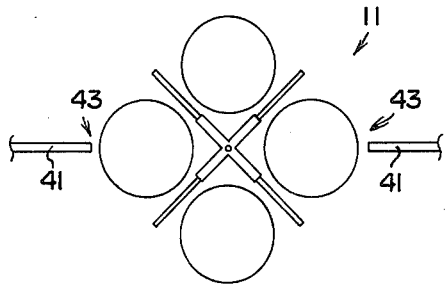
FIG. 2 is a top plan view of the present invention with some parts removed and in combination with a suitable enclosing structure.

The rack 11, when used in combination with an enclosing structure 41 (such as a fence) and an opening 43, results in an arrangement whereby the rack 11 can revolve in turnstile fashion while at the same time blocking the opening 43 (see FIG. 2). With the rack 11 in a fixed position (by means of stationary center post 31) inside the opening 43 of the enclosing structure 41, the rack 11 can revolve and selectively present the refuse containers in succession to either the exterior or interior area of the enclosing structure 41 while constantly blocking the opening 43 of the enclosing structure 41.

As thus constructed and used, the present invention provides a mobile rack for supporting refuse containers above a supporting surface.

Although the invention has been described and illustrated with respect to a preferred embodiment thereof, it is not to be so limited since changes and modifications may be made therein which are within the full intended scope of the invention.

I claim:

1. A mobile rack for supporting four refuse containers in upright positions said rack comprising:
   a. a frame means including a platform member for restingly supporting the four refuse containers;
   b. a substantially ring-like restraining means disposed in a substantially horizontal plane above said platform member for circumscribing and confining the four upright refuse containers;
   c. a substantially cross-like brace means disposed in a substantially horizontal plane above said platform member for dividing the interior of said ring-like restraining means into four parts and for cooperating with said ring-like restraining means in confining the four upright refuse containers, each of said parts of said ring-like restraining means receiving one of the four upright refuse containers.
   d. means for mounting said ring-like restraining means and said cross-like brace means to said platform member at a height above said platform member that is at or above the center of gravity of the upright refuse container and is at or below the top of the refuse container so as to confine the refuse containers to said platform member; and
   e. means for movably supporting said platform member on a supporting surface so that said mobile rack may selectively be manually moved along a straight line and about a central point in carousel fashion.

2. The mobile rack of claim 1 in which ring-like restraining means and said cross-like brace means are mounted above said platform member at heights offset from one another.

3. The mobile rack of claim 2 in which said ring-like restraining means consist of a single ring-like band, and in which said cross-like brace means consist of a pair of elongated members positioned substantially transverse of one another.

4. The mobile rack of claim 2 in which said means for mounting said restraining means and said brace means includes a plurality of stanchion members extending upwardly from said platform member at uniform intervals for cooperating with said restraining means and said brace means in confining the several refuse containers, in which is included means for attaching said stanchion members adjacent the lower ends thereof to said platform member, and in which said means for movably supporting said platform member on a supporting surface includes a plurality of casters rotatably attached to said frame means with each of said casters being free to swivel about a vertical axis.

5. The rack as set forth in claim 1 in which said frame means includes concentrically disposed tubular sleeve means fixedly attached to said platform member, and in which is included an upright center post freely passed through said sleeve means and being supported in a fixed condition whereby said frame means is free to revolve about said upright center post in carousel fashion.

6. The device as set forth in claim 5 in which said frame means includes a plurality of radially disposed arm members respectively attached to the upper ends of said stanchion members, said sleeve means having lower and upper portions thereto with the lower portion thereof being attached to said platform member, and said plurality of radially disposed arms converging at said upper portion of said sleeve means and being attached thereto with said center post freely passing through said lower and upper portions of said sleeve means.

7. The device as set forth in claim 5 in which the lower end of said center post is tapered to facilitate being driven into the earth's surface thus being supported in said fixed condition.

8. The device as set forth in claim 6 in which is included first knock-down means for facilitating assembly and disassembly of said stanchion members with said platform member, second knock-down means for facilitating assembly and disassembly of said restraining means with said stanchion members, and third knock-down means for facilitating assembly and disassembly of said arm members with said upper portion of said sleeve means thus providing for more compact storage and shipping of said device.

9. In combination with an enclosing structure providing a barrier against passage between an interior area and an exterior area and having an opening provided therein establishing a pathway between the interior and exterior areas, of a mobile rack for supporting refuse containers in upright positions, said mobile rack comprising frame means disposed within said opening of said enclosing structure for blocking said pathway; said frame means including a platform member for restingly supporting thereupon several of the refuse containers, a ring-like restraining means disposed in a substantially horizontal plane a spaced distance above said platform member that is at or above the center of gravity of the upright refuse containers and is at or below the top of the upright refuse containers for circumscribing and confining the several upright refuse containers, a substantially cross-like brace means disposed in a substantially horizontal plane a spaced distance above said platform member that is at or above the center of gravity of the upright refuse containers and is at or below the top of the upright refuse containers for dividing the interior of said ring-like restraining means into several parts and for cooperating with said ring-like restraining means in confining the upright refuse containers, a plurality of stanchion members extending upwardly from said platform member at uniform intervals for mounting said restraining means and said brace means to said platform member and for cooperating with said restraining means in confining the several refuse containers, said restraining means being joined to said stanchion members, means for attaching said stanchion members adjacent the lower ends thereof to said platform members, and concentrically disposed tubular sleeve means fixedly attached to said platform member; a plurality of casters rotatably attached to said frame means for ridably supporting said platform member a spaced distance above a supporting surface with said casters being free to swivel about a vertical axis, and an upright center post freely passed through said sleeve means and being fixed to the supporting surface with said frame means being free to revolve about said center post in turnstile fashion with respect to said enclosing structure whereby manual rotation of said frame means selectively presents each of the refuse containers in succession to the interior and the exterior areas for easy access thereto from either area while constantly blocking the pathway therebetween.

10. The device as set forth in claim 9 in which said frame means includes a plurality of radially disposed arm members respectively attached to the upper ends of said stanchion members, said sleeve means including lower and upper sleeves with said lower sleeves being attached to said platform member, and said plurality of radially disposed arms converging at said upper sleeves and being attached thereto with said center post freely passing through said lower and upper sleeves.

11. The device as set forth in claim 9 in which the lower end of said center post is tapered to facilitate being driven into the earth's surface thus being supported in said fixed condition.

12. The device as set forth in claim 10 in which is included first knock-down means for facilitating assembly and disassembly of said stanchion members with said platform member, second knock-down means for facilitating assembly and disassembly of said restraining means with said stanchion members, and third knock-down means for facilitating assembly and disassembly of said arm members with said upper portion of said sleeve means thus providing for more compact storage and shipping of said device.

* * * * *